March 17, 1942.  O. WATSON  2,276,901
LIQUID GAUGE
Filed Oct. 2, 1939
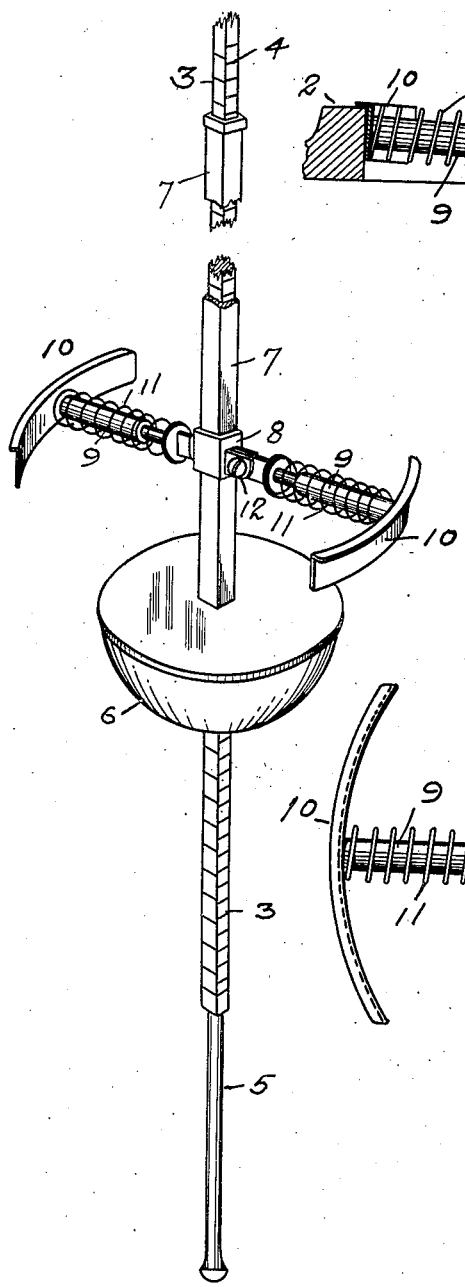
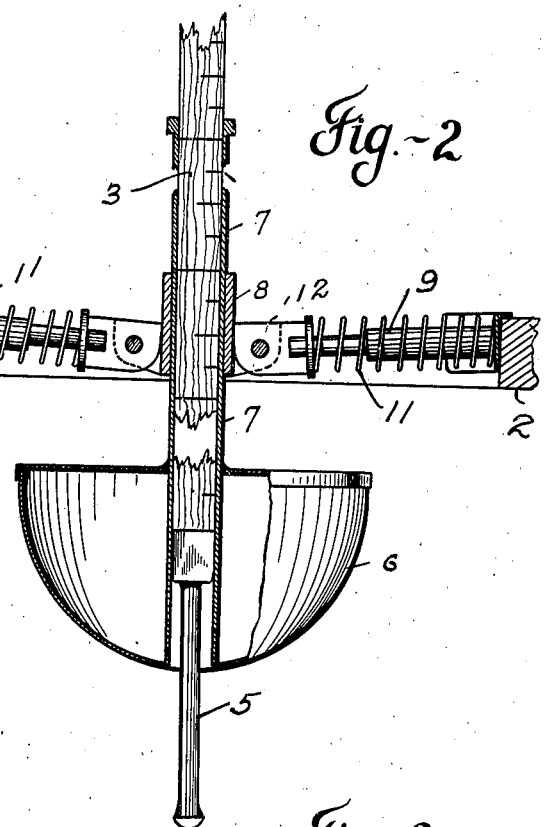
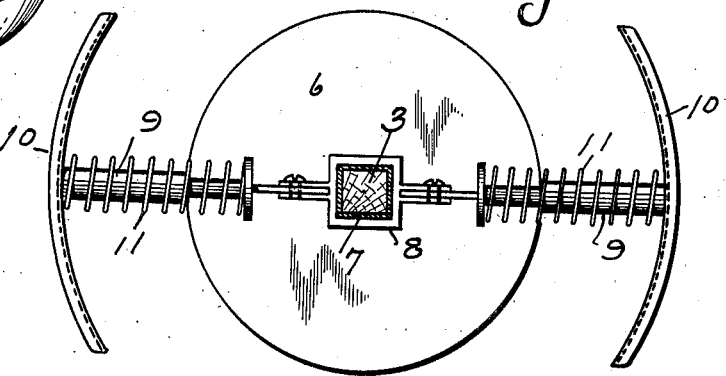
Inventor
Oliver Watson
By F. L. Walker
Attorney Patented Mar. 17, 1942

2,276,901

UNITED STATES PATENT OFFICE 2,276,901

LIQUID GAUGE

Oliver Watson, Dayton, Ohio, assignor of one-half to Bert F. Downey, Springfield, Ohio Application October 2, 1939, Serial No. 297,523

18 Claims. (Cl. 73—319)

This invention pertains to ullage rods or liquid gauges, and more particularly to a float-operated gauge for automatically measuring and indicating the volume of liquid contents of a tank or container in which the gauge is disposed.

While the present gauge is especially adapted for indicating fluctuations of the liquid level of a tank car or tank wagon, to enable measured quantities of liquid to be supplied thereto or discharged therefrom it is also applicable to storage or supply tanks of various other types, styles and purposes.

The present gauge is a further development and amplification of that disclosed in copending application Serial No. 132,259, filed March 22, 1937, and since matured into Letters Patent No. 2,189,236.

The object of the present invention is to improve the construction as well as the means and mode of operation of float-operated liquid gauges whereby they may not only be economically manufactured, but will be efficient in use, automatic in operation, uniform in action, having relatively few operating parts and be unlikely to get out of repair.

A further object of the invention is to provide an ullage rod or gauge especially adapted for use in delivery tank trucks or cars by which a distant operator within observation range of the gauge may accurately determine measured quantities of liquid supplied to or discharged from the tank.

A further object of the invention is to provide an improved cooperative association of a graduated gauge rod, an indicating float, and means for supporting the assembly in upright position in relation to the tank.

A further object of the invention is to provide a compact, light-weight structure convenient to install and remove from a tank and which will withstand rough usage.

A further object of the invention is to improve the construction shown in the Letters Patent before mentioned and embody the dominant features thereof in improved commercial form.

A further object of the invention is to provide a liquid gauge having the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

Referring to the drawing, wherein is shown the preferred but obviously not necessarily the only form of embodiment of the invention, Fig. 1 is a perspective view partly broken away of an assembled gauge embodying the present invention. Fig. 2 is a side elevation partly in section thereof. Fig. 3 is a top plan view thereof partly in section.

Like parts are indicated by similar characters of reference throughout the several views.

The present gauge is especially adapted for insertion in and removal from an opening of a tank or container, the contents of which are to be measured and with the margin 2 of which the device is detachably engageable.

The gauge assembly includes a graduated gauge rod 3 having thereon a succession of graduations 4 indicative of units of liquid measurement. If so desired, the gauge rod may bear on different sides thereof different series of graduations corresponding to the size of different tanks or containers with which the gauge may be employed. In order that the gauge rod will readily descend to and rest upon the bottom of the tank, there is provided at the lower end a ballast weight 5. In the present instance, the ballast weight comprises an elongated stem or foot having a rounded terminal at one end for contact with the tank bottom and a socket at its upper end in which the lower end of the gauge rod is seated.

Surrounding and slidingly mounted on the gauge rod 3 is a float 6 having a tubular stem 7 fixedly attached thereto and extending through the float, through which the gauge rod is freely inserted. As the float 6 rises and falls with fluctuation of the liquid level of the contents of a tank being measured, the float 6 rides up and down the gauge rod. The top extremity of the tubular stem 7 coacts with the graduations on the rod to indicate the measured volume of contents of the tank. In the present instance the rod 3 and tubular float stem have been shown as of rectangular cross section. However, they may be cylindrical, hexagonal, or of other shape.

To support the gauge rod and float in upright position, a supporting sleeve 8 surrounds the float stem 7, through which the float stem is freely movable axially of the rod 3. Carried by the guide sleeve 8 are oppositely extending spring-biased telescopic arms 9, each having a head 10 engageable with the marginal flange 2 of a tank opening under reactive influence of springs 11. The supporting arms 9 may be fixedly secured to the sleeve 8, but are preferably pivoted to lugs or ears 12 carried by the sleeve 8 for folding adjustment into parallel relation with the gauge rod and float stem for convenient storage and transportation.

The gauge rod 3, float 6 with its stem 7, and the supporting sleeve 8 are concentrically disposed, but are otherwise unattached and free for axial reciprocatory motion each independent of the other. When mounted in a tank opening by the expansive engagement of the outrigger arms 9 with the tank, the sleeve 8 remains stationary, but the float stem 7 is axially slidable relative thereto with the rise and fall of the float, and the gauge rod 3 is likewise free for to and fro axial movement into and out of the float 6 and float tube 7. That is to say, while concentrically assembled, the several elements are independently movable, each being free for to and fro axial adjustment relative to the others.

To afford more secure engagement of the supporting arms 9 with the tank, the pivotal connections of the arms with the ears or lugs 12 are such that the arms 9, which have a toggle-like action, are adjustable slightly beyond dead center relation when engaged with the tank, as is shown in Fig. 2, whereby the reaction of the springs 11 tends to maintain such engagement.

Such assembly is relatively light, but strong, and automatically responds to fluctuations of liquid level within the tank to accurately indicate upon the gauge rod 3 the measured volume of contents of the tank by the relation of the end of the float tube 7 to the graduations 4 upon the rod. The rod 3 is free for complete removal, and the float tube 7, the length of which is approximately equal to the depth of the tank, is free for vertical movement relative to both the gauge rod and the supporting device. Obviously, other forms of detachable connection of the supporting sleeve 8 with the tank may be substituted for the spring-biased arms. The invention is, therefore, not dependent upon the specific spring-arm supporting structure.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A fluid gauge of the type wherein a float rises and falls relative to a graduated gauge rod with change of fluid level of the contents of a container to indicate thereby proportionate measured change of volume of the contents thereof, including a rectangular gauge rod, a weighted extension of the rod by which the rod is caused to rest on the bottom of the tank by gravity, a float assembly including a rectangular tubular stem attached to the float through which the gauge rod extends, the float and stem being freely movable relative thereto, a rectangular tubular guide sleeve surrounding the tubular float stem, the guide sleeve and float stem being freely axially movable relative to each other and a supporting arm carried by the tubular guide sleeve and detachably engageable with the container.

2. A fluid gauge of the type wherein a float rises and falls relative to a graduated gauge rod with change of fluid level of the contents of a container to indicate thereby proportionate measured change of volume of the contents thereof, including a graduated gauge rod, a float assembly freely movable thereon, a pair of oppositely disposed spring biased arms detachably engageable with the container in which the float and gauge rod are positioned, and a guide member carried by the arms loosely supporting the gauge rod in upright position relative to which both the float and gauge rod are freely movable in a vertical direction.

3. A fluid gauge of the type wherein a float rises and falls relative to a graduated gauge rod with change of fluid level of the contents of a container to indicate thereby proportionate measured change of volume of the contents thereof, including a graduated gauge rod, a float including a tubular guide stem through which the rod freely extends, a pair of oppositely disposed spring tensioned arms engageable with the container, a guide sleeve carried thereby through which the tubular float stem freely extends, the construction and arrangement being such that the tubular float stem, the gauge rod and the guide sleeve are all axially adjustable, each independently of the others.

4. A fluid gauge of the type wherein a float rises and falls relative to a graduated gauge rod with change of fluid level of the contents of a container to indicate thereby proportionate measured change of volume of the contents thereof, including a gauge rod, a float mounted for to and fro vertical movement relative to the gauge rod, and a support detachably engageable with the container loosely supporting the gauge rod in upright position relative to which both the rod and the float are freely movable axially of the rod and independently of each other, so constructed and arranged that the gauge may be removably inserted as a unit in the container.

5. A fluid gauge of the type wherein a float rises and falls relative to a graduated gauge rod with change of fluid level of the contents of a container to indicate thereby proportionate measured change of volume of the contents thereof, including a graduated gauge rod, a float, and a supporting guide detachably engageable with the container loosely supporting the gauge rod in the upright position relative to which both the float and the gauge rod are independently adjustable, the construction and arrangement being such that the component parts thereof may be removably inserted in the container.

6. A fluid gauge of the type wherein a float rises and falls relative to a graduated gauge rod with change of fluid level of the contents of a container to indicate thereby proportionate measured change of volume of the contents thereof, including a graduated gauge rod, a float including a tubular stem through which the gauge rod extends for free relative sliding movement, and a guide sleeve detachably engageable with the container through which the tubular float stem extends for free relative sliding movement.

7. A fluid gauge of the type wherein a float rises and falls relative to a graduated gauge rod with change of fluid level of the contents of a container to indicate thereby proportionate measured change of volume of the contents thereof, including a gauge rod, a float including a tubular guide stem and a guide sleeve detachably engageable with the container, the gauge rod, tubular float stem and guide sleeve being concentrically arranged for independent free axial movement one relative to another.

8. A fluid gauge of the type wherein a float rises and falls relative to a graduated gauge rod with change of fluid level of the contents of a container to indicate thereby proportionate measured change of volume of the contents thereof, including a rectangular gauge rod, a weighted extension of the rod by which the rod is caused to rest on the bottom of the tank by gravity, a float including a rectangular tubular stem attached to the float through which the gauge rod extends, the float and stem being freely movable relative thereto, a rectangular tubular guide sleeve surrounding the tubular float stem, the guide sleeve and float stem being freely axially movable relative to each other, and a supporting arm carried by the tubular guide sleeve and detachably engageable with the container.

9. A fluid gauge of the type wherein a float rises and falls relative to a graduated gauge rod with change of fluid level of the contents of a container to indicate thereby proportionate measured change of volume of the contents thereof, a graduated gauge rod, a weighted extension on the lower end of the rod by which the rod is caused to rest on the bottom of the container by gravity, a float having an elongated guide stem associated with said rod, a support for loosely maintaining the gauge rod in upright position permitting free movement of the rod and float relative thereto, and a pair of spring biased arms carried by the support and detachably engageable with the container for maintaining the support in adjusted position.

10. A fluid gauge of the type wherein a float rises and falls relative to a graduated gauge rod with change of fluid level of the contents of a container to indicate thereby proportionate measured change of volume of the contents thereof, a graduated gauge rod, a float, an elongated tubular guide stem attached to the float and surrounding the rod and freely movable relative thereto in accordance with fluctuations of fluid level of the container, and a guide therefor detachably engageable with the container relative to which the float stem and gauge rod are axially movable.

11. A fluid gauge of the type wherein a float rises and falls relative to a graduated gauge rod with change of fluid level of the contents of a container to indicate thereby proportionate measured change of volume of the contents thereof, a graduated gauge rod, a float associated therewith and freely movable relative thereto in accordance with fluctuations of fluid level of the container, a guide sleeve for the float independent of the gauge rod relative to which the float is movable, and a pair of oppositely extending spring-biased arms carried by the sleeve and detachably engageable with the container for supporting the gauge rod and float in vertical position.

12. A liquid gauge wherein the quantity of liquid contents of a container is indicated by the rise and fall of a float relative to a graduated gauge rod, a graduated gauge rod, a float associated therewith, means carried by the float and cooperating with the graduations of the rod to indicate the quantity of contents of the container in units of liquid measurement, guide means relative to which both the float with its indicating means and the graduated gauge rod are independently movable, and spring biased arms carried by the guide means and detachably engageable with the container for supporting said guide means in adjusted position.

13. A liquid gauge wherein the quantity of liquid contents of a container is indicated by the rise and fall of a float relative to a graduated gauge rod, a graduated gauge rod, a float associated therewith, means carried by the float and cooperating with the graduations of the rod to indicate the quantity of contents of the container in units of liquid measurement, and spring biased supporting means detachably engageable with the container loosely supporting the gauge rod and float in upright position, relative to which the float and the gauge rod are independently movable.

14. A liquid gauge wherein the quantity of liquid contents of a container is indicated by the rise and fall of a float relative to a graduated gauge rod, a graduated gauge rod, a float associated therewith, means carried by the float and cooperating with the graduations of the rod to indicate the quantity of contents of the container in units of liquid measurement, a ballast weight on the lower end of the gauge rod for maintaining the gauge rod at maximum depth in the tank, and spring biased guide means detachably engageable with the container loosely supporting both the rod and float in upright position and relative to which both the rod and float are independently adjustable.

15. In an ullage rod of the type wherein a float is mounted for rising and falling movement relative to a normally buoyant gauge rod having thereon a series of graduations indicative of units of liquid measurement, a support relative to which the rod is longitudinally adjusted, a float adjustable relative to both the rod and support and an elongated continuing ballast stem at the lower end of the graduated rod of sufficient weight to overcome the inherent buoyancy of the gauge rod and fixedly united therewith, adapted to hold the gauge rod in contact with the bottom of a container by gravity, the construction and arrangement being such that the ullage rod as a unit is bodily removable from the container.

16. A liquid gauge, including a float body, a fixedly attached tubular stem carried thereby, a graduated gauge rod insertable through the tubular stem with the graduations of which the extremity of the tubular stem cooperates to indicate in units of liquid measurement the fluctuations of the float.

17. A fluid gauge including a guide sleeve, gauge elements freely movable relative thereto and oppositely disposed spring-biased outrigger arms carried by the sleeve and engageable with a container in which the gauge is disposed for holding the guide sleeve stationary relative to the container while the gauge elements are relatively adjusted in accordance with the contents of the container.

18. A liquid gauge, including a guide sleeve, gauge elements freely movable relative thereto, and oppositely disposed arms pivotally connected to the guide sleeve and detachably engageable with the margin of a container opening into which the gauge elements are loosely inserted through said guide sleeve.

OLIVER WATSON.